United States Patent [19]

Sullivan, Jr. et al.

[11] 4,256,292
[45] Mar. 17, 1981

[54] JOUNCE BUMPER FOR SUSPENSIONS

[75] Inventors: Leo S. Sullivan, Jr.; Patsy DeVincent, both of Dayton, Ohio

[73] Assignee: General Motors Corporation, Detroit, Mich.

[21] Appl. No.: 964,594

[22] Filed: Nov. 29, 1978

[51] Int. Cl.³ .............................................. F16F 13/00
[52] U.S. Cl. .................................... 267/8 R; 188/321; 267/33; 267/140.2
[58] Field of Search .................. 188/321, 322; 267/33, 267/34, 35, 140, 140.1, 140.2, 141, 153, 8 R

[56] References Cited

U.S. PATENT DOCUMENTS

| 3,412,990 | 11/1968 | Gladstone | 267/35 |
| 3,434,708 | 3/1969 | Hawk | 267/153 |
| 3,806,106 | 4/1974 | Hamel et al. | 267/153 |
| 3,954,255 | 5/1976 | Keijzer et al. | 267/34 |
| 4,053,148 | 10/1977 | Chalmers | 267/153 |

FOREIGN PATENT DOCUMENTS

| 2294869 | 7/1976 | France | 188/321 |
| 6703785 | 9/1968 | Netherlands | 188/321 |
| 788484 | 1/1958 | United Kingdom | 267/140.2 |

Primary Examiner—Edward R. Kazenske
Attorney, Agent, or Firm—Charles R. White

[57] ABSTRACT

Suspension strut which incorporates a jounce bumper of a suitable rubber or elastomer having an outwardly oriented knee which yields under low axial compression to provide a low initial spring rate as the suspension initially contacts the bumper. As the suspension travel increases, the knee in the bumper wall continues to yield so that the internal shape of the walls of the jounce bumper become active and progressively increases the effective contact area to provide a progressively increasing spring rate and improved jounce control.

2 Claims, 4 Drawing Figures

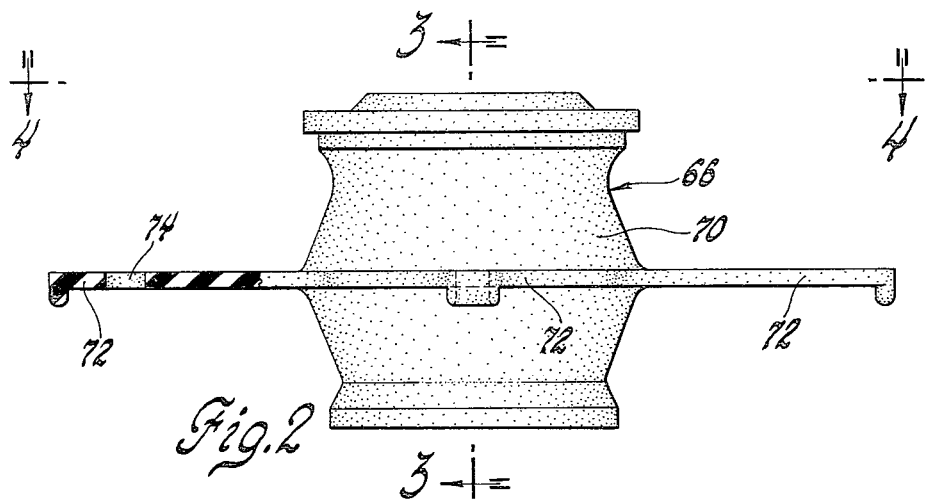
Fig. 2
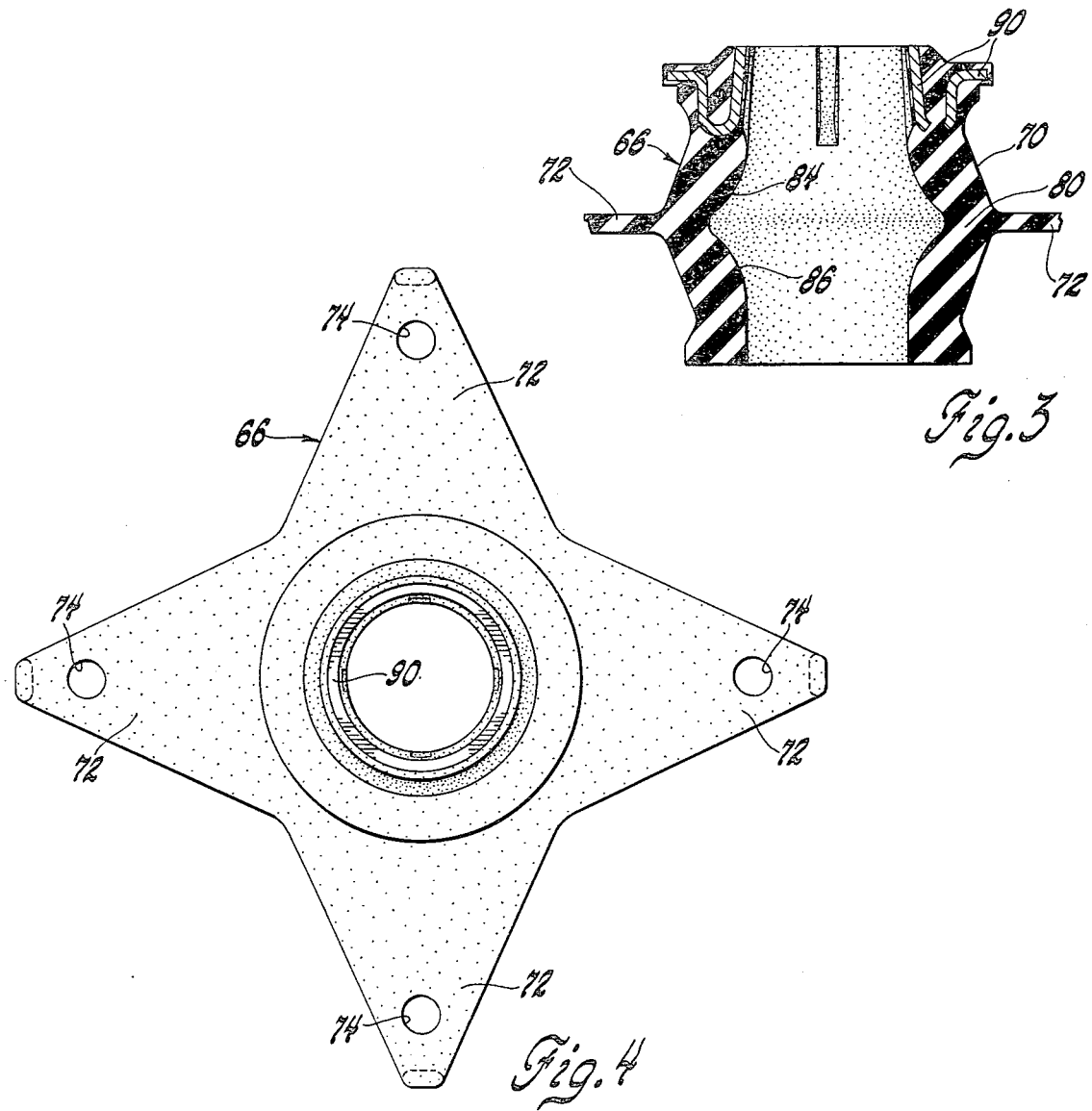
Fig. 3
Fig. 4

JOUNCE BUMPER FOR SUSPENSIONS

This invention relates to automotive suspensions and more particularly to a new and improved jounce bumper for a suspension strut providing improved control of suspension travel at full compression.

MacPherson struts as employed in many small economy type vehicles comprise a combination wheel suspension strut and shock absorber which eliminates the requirement for an upper control arm. With such struts there is increased space for the engine and transmission within a front compartment plus the greater adaptability to front wheel drive and a reduction in total vehicle weight.

MacPherson strut suspension travel is controlled at full compression by jounce bumpers mounted axially on the shock absorber piston rod of the strut. Generally, these jounce bumpers are either convoluted in shape and function by a progressive stacking of the convolutions to provide resistance to jounce forces or are solid in cross section employing softer elastomers in straight compression. This invention concerns improvement in jounce bumpers for MacPherson strut suspensions and the like which is an advancement over the conventional designs and more specifically with respect to the spring rate and minimum compressed height. The dynamic rate of the jounce bumper is an extremely important factor in overall vehicle ride. Too high an initial rate produces ride harshness as the suspension contacts the elastomer bumper. Too low an initial rate results in a rapid spring rate build-up or strike through to the metal suspension travel stop provided on the suspension at full jounce travel.

The jounce bumper in this invention employs a different functional principle as compared to prior jounce bumpers described above. The bumper of the preferred embodiment of this invention is generally barrel-shaped in configuration and is formed with a wall of rubber or elastomer that has an outwardly oriented knee portion in the transverse center which yields under low axial compression. This initial yielding or flexing provides a low initial spring rate as the suspension first contacts the jounce bumper. As the suspension travel increases, the internal walls of the jounce bumper become active and the effective contact area of the inner walls progressively increase as the knee provided in the wall of the bumper continues to yield. Compression of the elastomer then begins to provide the major resistance to the suspension forces on jounce. With this invention a predetermined load/deflection rate is achieved by an outwardly yielding shape of the bumper combined with a specifically contoured internal wall which increases the contact area of the elastomer under compression at a predetermined rate. The jounce bumper of this invention is reduced height at full compression compared to conventional jounce bumper designs. Minimum compressed height allows full suspension travel with smaller components resulting in space, weight and cost savings. The reduced height is primarily achieved by the kneeing of the bumper wall radially outwardly from the integral metal suspension stop in the bumper rather than stacking elements as in convoluted designs or by compressing the elastomer as in solid cross sectional designs. Also, this invention includes the provision of a new and improved elastomer jounce bumper with a knee portion intermediate the upper and lower ends thereof which provides improved damping properties through spring rate control by the increase of the effective contact area of the internal walls as the knee in the wall progressively yields outwardly and by the improved durability compared to solid cross sectional designs which require lowered tensile polymers to achieve the required rate characteristics.

These and other features, objects and advantages of this invention will become more apparent from the following detailed description and drawings in which:

FIG. 2 is a side elevational view partially in cross section of the jounce bumper used in the FIG. 1 embodiment;

FIG. 3 is a cross sectional view taken along lines 3—3 of FIG. 2 and looking in the direction of the indicator arrows; and FIG. 4 is a top view taken along lines 4—4 of FIG. 2 and looking in the direction of the indicator arrows.

Figure 1:
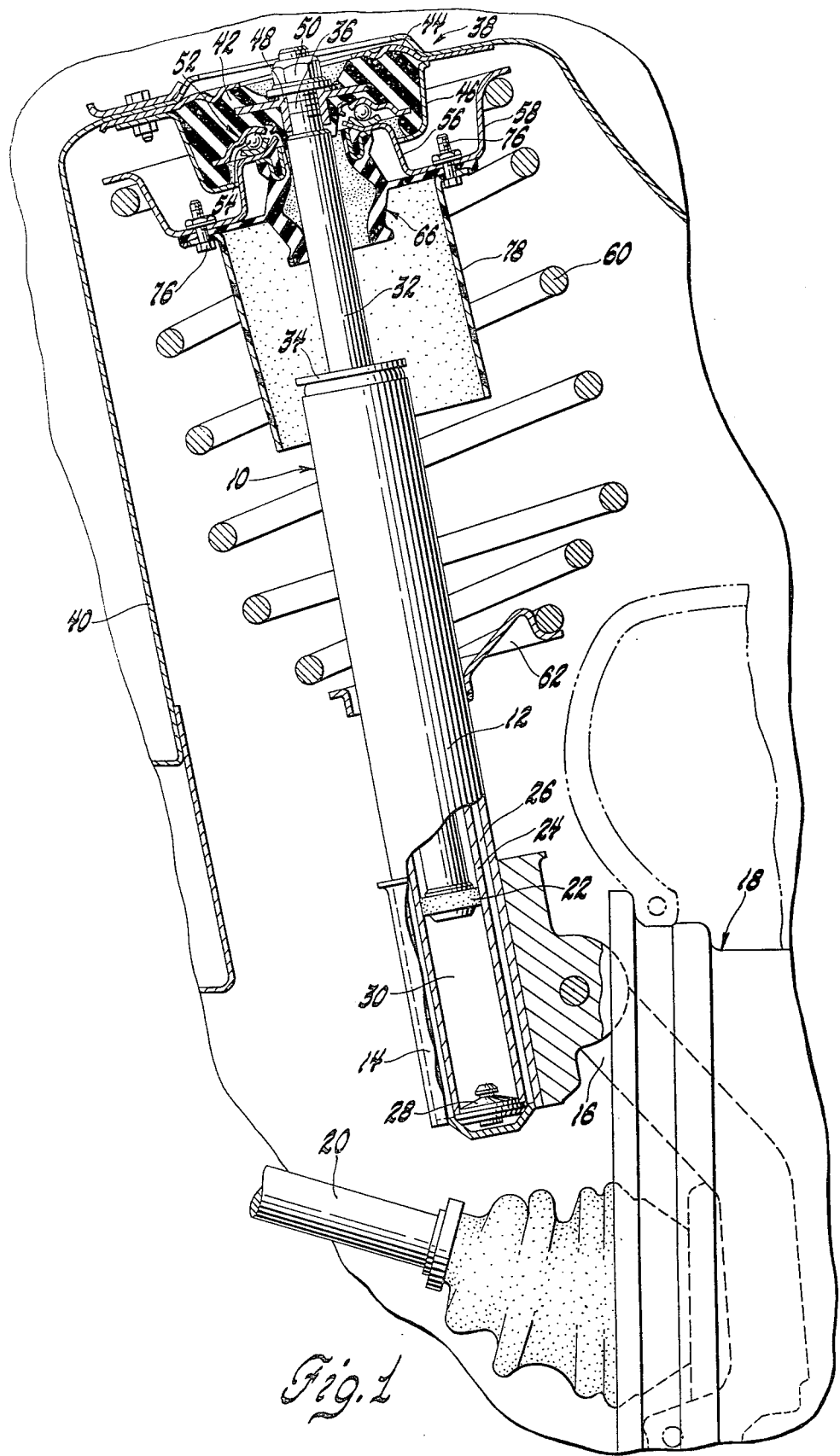
FIG. 1 is an end view in partial cross section of a front suspension system of a vehicle which embodies this invention.

Turning now in greater detail to the drawings, there is shown in FIG. 1 a portion of the front suspension of a vehicle which incorporates a MacPherson type suspension strut 10 that has an outer reservoir tube 12 supported at its lower end in a cup-like mounting bracket 14. This mounting bracket is attached to a steering knuckle 16 of a steerable front road wheel assembly 18 driven by rotatable axle 20. Secured within the reservoir tube 12 is a hydraulic shock absorbing cartridge having a valved piston 22 mounted for reciprocating sliding movement in a cylinder tube 24 radially spaced inwardly from the reservoir tube to provide a reservoir 26 for the hydraulic damping fluid of the strut. A base valve 28 provides for the controlled hydraulic communication between the reservoir and the variable volume compression chamber 30 formed by the reciprocating piston and the cylinder tube 24. The piston is connected to the lower end of a cylindrical piston rod 32 which extends axially and upwardly through an end cap 34 fastened to the upper end of the reservoir tube.

The piston rod has a reduced diameter and threaded upper end 36 for attachment to the strut mount assembly 38 that is in turn secured to the sheet metal tower 40 formed in the wheel well of the vehicle body. The strut mount assembly 38 comprises a resilient torodial isolator cushion 42 of a suitable elastomer material which is sandwiched between cup-like upper and lower sheet metal retainer members 44 and 46 that have outwardly extending flange portions which are suitably attached together. Centrally located within the isolator cushion 42 is a metallic bushing 48 having a radial flange that projects into the material of the cushion and which has a cylindrical hub through which the upper end of the piston rod 36 extends. Nut 50 threaded onto the upper end of the piston rod secures the piston rod to the strut mount 38. The strut mount assembly further includes an annular bearing assembly 52 having upper and lower races for a plurality of ball bearings 54. The lower race of bearing assembly 52 is adapted to contact the inwardly extending peripheral flange 56 of an annular cupped spring seat 58 which can be turned relative to the mount. The spring seat has a central opening through which the piston rod 32 extends. The outer periphery of spring seat 58 engages the upper coil of a helical suspension spring 60 which spirals downwardly around the piston rod and the cylinder tube of the strut into engagement with a lower spring seat 62 which is centrally secured to the reservoir tube 12. With the suspension spring operatively mounted between the upper and lower spring seats, the vehicle body is resiliently supported or suspended so that bumps or other roadway irregularities encountered by the road wheel will not detract from the ride. Oscillation and other spring motions are damped by the shock absorber cartridge as the piston reciprocates within the oil filled cylinder tube 24. In the event of a severe jounce, the suspension spriing will be collapsed as the piston rod 32 telescopes rapidly into the cylinder tube.

To provide for improved cushioning of severe jounce loads, this invention incorporates a resilient jounce bumper 66 operatively mounted on the underside of the spring seat 58 and which axially extends toward the strut and which is adapted to be contacted by the end cap 34 of the strut reservoir tube under operation conditions described below. The jounce bumper 66 comprises a barrel-shaped main body 70 formed from a generally cylindrical wall of elastomer or rubber material which, when installed, surrounds the piston rod and which has flat triangular arm portions 72 which extend radially from the bulged midportion of the body and which have axial openings 74 in the tips thereof. Fasteners 76 extend through these openings and corresponding openings in the spring seat on which fastener nuts are threaded for attachment of the jounce bumper to the spring seat. A cylindrical plastic splash shield 78 extending axially and around the jounce bumper and the piston rod is also secured at its flanged upper end to the spring seat 58 by the fasteners 76.

As best shown in FIG. 3, the wall forming the jounce bumper is kneed radially outwardly at its transverse center 80. This annular and outwardly oriented knee portion of the jounce bumper readily yields under load to provide a low spring rate as the shock absorber cap 34 initially contacts and displaces the lower end of the jounce bumper. The inner wall of the jounce bumper is thickened and internally contoured at 84 and 86 on opposite sides of the knee portion. When these contoured portions engage on jounce, there is an increase in effective contact area and spring rate as the knee in the wall continues to yield. Assuming continued telescoping movement into the cylinder tube on jounce compression of the elastomer then begins to provide the major resistance to the jounce travel of the suspension components. Thus, the load deflection rate is increased at a predetermined rate to yieldably control suspension travel. With specifically contoured walls which increase the contact area and in effect act as a thick wall portion to the required load deflection characteristics, the energy management characteristics are tailored. The annular steel insert 90 generally U-shaped in cross section and integral with the upper end of the bumper 66 provides a positive stop to limit jounce travel.

In this invention, reduced height of the jounce bumper at full compression is provided. Minimized compressed height allows full suspension travel with smaller components resulting in space, weight and cost savings. This is provided by the kneeing out of the bumper wall radially outwardly from the integral metal suspension stop or insert 90 which is molded in the bumper rather than stacking the elements as in convoluted designs or compressing the elastomer as in solid cross section designs. With this invention, there is improved cushioning means for obtaining specific static and dynamic spring rate characteristics in a smaller space. With improved control of jounce, there is improved ride control and vehicle handling as well as improved comfort of vehicle operator and passengers.

While a preferred embodiment has been shown and described to illustrate the invention other embodiments will become apparent to those skilled in the art. Accordingly, the scope of this invention is set forth in the following claims.

The embodiments of the invention in which an exclusive property or privilege is claimed are defined as follows:

1. A telescoping shock absorbing and suspension unit operatively connected between sprung and unsprung masses of a vehicle comprising a support tube operatively connected to said unsprung mass of said vehicle, a cylinder tube fixed in said support tube having a hydraulic damping fluid therein, a valved piston mounted for sliding reciprocal movement in said cylinder tube, a piston rod operatively connected to said piston and extending through one end of said cylinder tube and said support tube, a mount for said unit attached to said sprung portion of said vehicle, fastener means operatively connecting the free end of said piston rod to said mount, a jounce bumper, attachment means securing said jounce bumper adjacent to said mount, said jounce bumper being formed of a polymer material to yieldably resist predetermined movement of said sprung and unsprung masses toward one another, said jounce bumper comprising a generally cylindrical and barrel-shaped wall encircling said piston rod and having upper and lower ends, said wall having a radially outwardly extending knee portion intermediate said upper and lower ends, said knee portion being adapted to deflect radially outwardly at a low spring rate when said bumper is initially loaded by contact with one end of said support tube, said wall of said jounce bumper having first and second internal contoured surface portions which intersect at said knee portion and which extend from opposite sides thereof to said upper and lower ends and which progressively engage one another in response to the progressive outward radial deflection of said knee portion to provide an increasing spring rate and increased yielding resistance to movement of said masses toward one another, an annular suspension spring support disposed below said mount and providing a seat for the upper end of a coil suspension spring encircling said cylinder tube, said attachment means comprising a plurality of circumferentially spaced arm means integral with and extending radially from said knee portion of said wall with the ends of said arm means being fastened to said annular suspension spring support radially inwardly from said seat.

2. A telescoping shock absorbing suspension unit operatively connected between sprung and unsprung masses of a vehicle comprising a support tube operatively connected to said unsprung mass of said vehicle, a cylinder tube fixed in said support tube having a hydraulic damping fluid therein, a valved piston mounted for sliding reciprocal movement in said cylinder tube, a piston rod operatively connected to said piston and extending through one end of said cylinder tube and said suppot tube, a mount for said unit attached to said sprung portion of said vehicle, fastener means operatively connecting the free end of said piston rod to said mount, a jounce bumper, attachment means securing said jounce bumper adjacent to said mount, said jounce bumper being formed of a resilient polymer material to yieldably resist predetermined movement of said sprung and unsprung masses toward one another, said jounce bumper having a generally cylindrical and barrel-shaped wall encircling said piston rod and extending between said support tube and said mount, said wall being formed with an annular and radially outwardly extending knee portion intermediate the upper and lower ends of said bumper, said knee portion being adapted to flex radially outwardly at a low spring rate when said bumper is initially loaded by contact with said one end of said support tube, said wall of said jounce bumper having internal contoured surface portions which intersect one another and extend from opposite sides of said knee portion and which engage one another in response to the initial outward deflection of said knee portion to provide a progressively increasing spring rate by the increase in the effective contact area of said surface portions of said walls to thereby provide progressive increased resistance to movement of said masses toward one another, an annular suspension spring support disposed below said mount and providing a seat for the upper end of a coil suspension spring encircling said cylinder tube, said attachment means comprising a plurality of circumferentially spaced arm means integral with and extending radially from said knee portion of said wall with the ends of said arm means being fastened to said annular suspension spring support radially inwardly from said seat.

* * * * *